United States Patent [19]

Tarvis, Jr.

[11] 4,454,983
[45] Jun. 19, 1984

[54] TEMPERATURE CONTROLLED VALVE

[76] Inventor: Robert J. Tarvis, Jr., Cummings and Oak Ave., Blenheim, Blackwood, N.J. 08012

[21] Appl. No.: 346,271

[22] Filed: Feb. 4, 1982

[51] Int. Cl.³ ............................................. G05D 23/12
[52] U.S. Cl. ..................................... 236/93 A; 165/40; 236/56; 251/5
[58] Field of Search ................ 236/56, 58, 93 A, 99 J, 236/99 R, 42, 64, DIG. 12; 251/5; 165/40; 73/4 R

[56] References Cited

U.S. PATENT DOCUMENTS

| | | | |
|---|---|---|---|
| 566,977 | 9/1896 | Frohlich | 236/99 R |
| 596,581 | 1/1898 | Edson | 73/4 R |
| 875,320 | 12/1907 | Burnet | 236/64 |
| 1,048,508 | 12/1912 | Dunham | 236/64 |
| 1,120,707 | 12/1914 | Froehlich | 236/99 R |
| 1,198,918 | 9/1916 | Holmberg | 236/64 |
| 2,095,506 | 10/1937 | Leutwiler | 236/64 |
| 2,590,215 | 3/1952 | Sausa | 138/45 |
| 2,804,773 | 9/1957 | Domingo et al. | 73/368.4 |
| 2,884,866 | 5/1959 | Patterson | 251/5 X |
| 2,902,222 | 9/1959 | Noakes | 236/93 A |
| 3,017,903 | 1/1962 | Steffens | 251/5 X |
| 3,022,670 | 2/1962 | Suttiffe, Jr. | 73/368.4 |
| 3,145,967 | 8/1964 | Gardner | 251/5 |
| 3,353,560 | 11/1967 | McCulloch | 251/5 X |
| 3,514,034 | 5/1970 | Cushman | 236/99 J X |
| 3,687,365 | 8/1972 | Laessig | 251/5 X |
| 4,248,376 | 2/1981 | Foller | 236/58 |

FOREIGN PATENT DOCUMENTS 16545 of 1903 United Kingdom ................... 236/56

Primary Examiner—William E. Tapolcai
Attorney, Agent, or Firm—Thomas A. Lennox

[57] ABSTRACT

A control valve used as a steam trap including a flexible flow adjustment restriction device, such as a flexible tube, with a chamber filled with a control fluid having a high co-efficient of thermal expansion and a heat conduction configuration conveying heat from the flow to the control fluid, such that a change in the flow temperature causes expansion or contraction of the control fluid to adjust the flexible flow adjustment member; to provide a universal steam trap.

27 Claims, 6 Drawing Figures

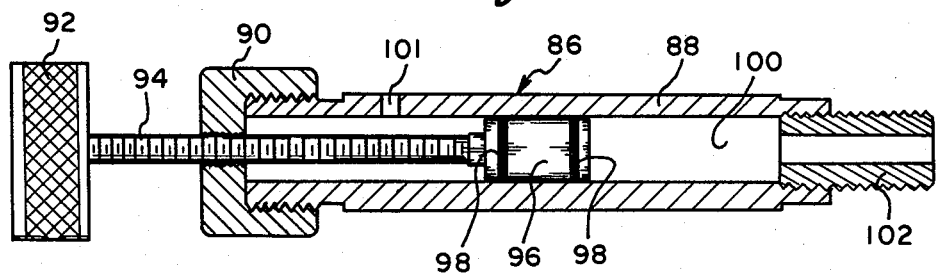
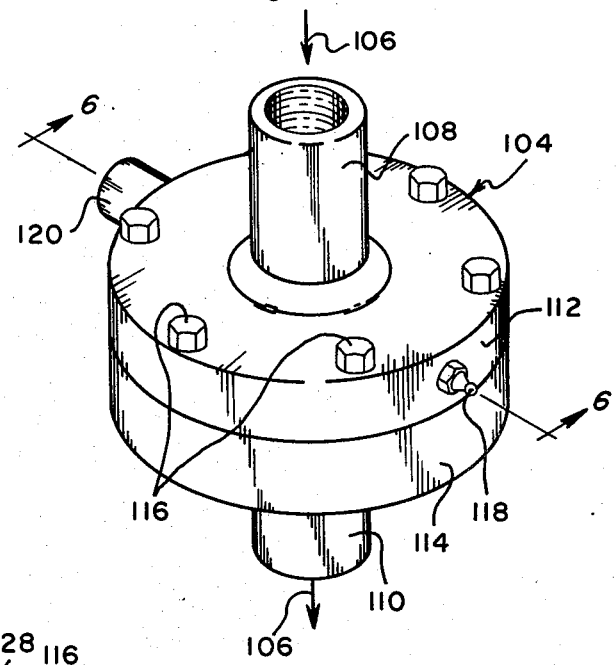
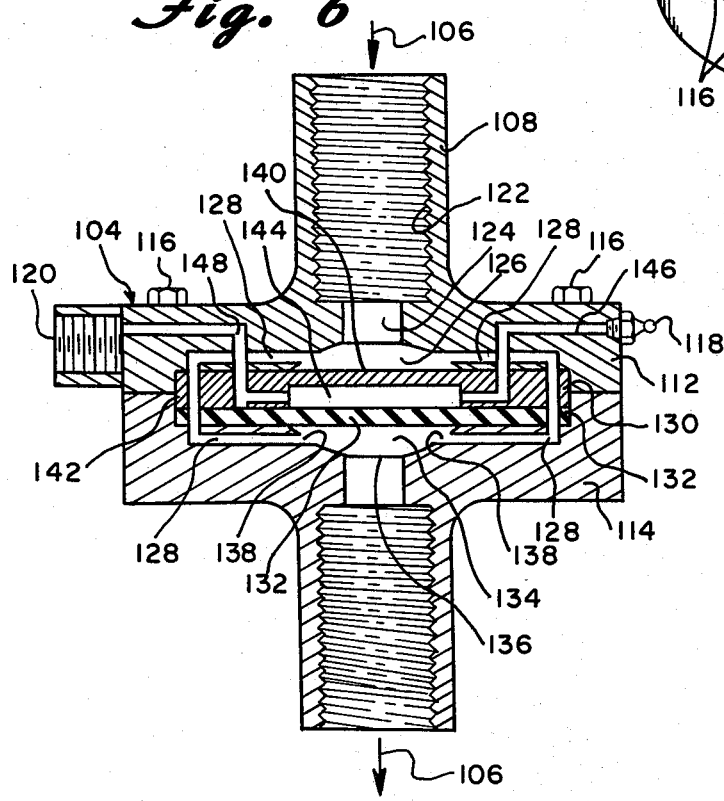

TEMPERATURE CONTROLLED VALVE

BACKGROUND OF THE INVENTION

Field of Invention

The field of this invention is control valves for fluid flow of gases, vapors, liquids and mixtures of these states. In particular, control valves of this invention are suitable for steam traps and are particularly effective in that use.

In the design, construction and operation of manufacturing, process and chemical plants, the control of fluid flow is a major concern to the design and operating engineer. It is also critical in environment heating and cooling systems. The size, shape and type of valves utilized at various control points results in a major cost of design and construction. In many applications it is desired to automatically control the flow of the fluid through a pipe, wherein the opening or closure action is effected directly by the temperature of the fluid flow being controlled. While one of the largest applications of this need is the steam trap, there are many additional uses for this type of control. For the purpose of clarification, the utility of the control valve of this invention will be described as it is applied to the steam trap application, but the control valves of this invention are not limited to that application.

Steam Trap Functions

In a major process or manufacturing plant, the steam trap provides an extremely important function. When operating properly and efficiently, it reduces the waste of energy and conserves heat energy in the system. However, its efficiency is limited and when it is inoperable or performing inefficiently through age, misuse or merely limitations on the type of steam trap chosen for that particular line, the heat and energy losses are substantial. Steam, as it releases its heat units through process application, pipe radiation loss, or whatever, ultimately returns to its water or condensate state. If this condensate is not drained immediately or "trapped" from the system, it reduces the operating efficiency by slowing the heat transfer process and can actually cause physical damage to the equipment.

The condensate accumulates along the bottom of a horizontal pipe and is swept along by the steam flow passing over it. Depending upon the volume and velocity, condensate may collect and fill the pipe, continuing to be swept along by the steam flow. If the velocity is sufficient, this water flow can do substantial damage to the equipment. It is therefore desirable in essentially all steam operated systems to remove the condensate as often and as efficiently as is practically possible. The condensate typically forms and collects at elevation changes such as risers and expansion loops, at all low points and on long horizontal runs and, of course, ahead of all dead-end areas, such as shut off valves, pressure and temperature control valves and at the ends of steam mains. In particular it is important to remove condensate ahead of humidifiers, pumps, turbines and other equipment where water droplets will substantially damage the equipment. In order to improve efficiency steam traps are used downstream from heat exchangers, coils, unit heaters, cooking kettles, dryers, and the like. The temperature at which the condensate is discharged may be quite important to maintain energy efficiency. With all these various uses and positions in the chemical process system for steam traps, and because of the physical and performance limitations on the various types of steam traps, many different types have been designed and marketed. While all of the many different types of steam traps operate by sensing the difference between steam and condensate, they may be classified as density operated (mechanical), temperature operated (thermostatic) and kinetic energy operated (disc and orifice). All of these various types have been necessary because of the limitations of the performance of the traps and not necessarily as the result of the specific operating principle involved. Thus, although the device of this invention is temperature operated, it does not necessarily fall into the same category or the limitations of the temperature operated steam traps presently available which include the balance-pressure thermostatic traps, and the thermostatic traps which are divided into the liquid-expansion and the bi-metal expansion traps. The operation, advantages and limitations of these various types of traps are well known to the process engineers and are excellently described in Bulletin Number T-511 printed April, 1979 by Sarco Company, 1951 26th Street, S.E., Post Office Box 119, Allentown, Pa. 18105, entitled "Steam Trap-Selection and Application Guide," incorporated herein by reference. As will be clear from this "Guide," the choice of the particular kind of trap is important for the application and needs of the particular situation.

Problems with Present Traps

The "choice" problem is not only the type of trap, but the size of the trap, thereby requiring a thorough study of the expected flow and the characteristics involved before choosing the particular kind and size of trap. These traps are expensive, complicated and involve a substantial portion of the total planning time in construction of a system operation. An incorrect choice of type or even size can result in poor performance or even complete lack of performance. Because of the nature of the device, it is common to use larger steam traps than necessary as they provide a substantial safety factor and if the steam trap is found to be too small for the particular location, substantial expense and delay may be required before the system becomes operational. However, a "too large" trap may be energy inefficient and is certainly more costly. In addition, redundant systems are required because steam traps create notorious maintenance problems. Strainer plugging is a common problem. As the steam trap ages, inefficiencies set in, due to wear, deposition of various solids at the critical moving parts. It is common at regular intervals to study, fix and replace the steam traps in a total system. A particular problem with essentially all of the prior steam traps is that it is most difficult to determine how well the device is performing. In many applications, a substantial steam leakage, resulting in energy losses, cannot be easily detected or if it can be detected, is difficult to determine whether the steam trap is the culprit. Such techniques as ultrasonic detection and other diagnostic tools are necessary to study the trap operation while on stream. Many of the more costly and more efficient steam trap devices are affected by particulates that might clog the working mechanism of the trap. This requires filtration upstream into the form of strainers and other devices, which is an entirely separate area of the art created because of the limitation of the steam trap devices presently available. With energy conservation becoming increasingly important, particularly in the process plant and boiler operations, even on a small scale level, the steam trap and its efficient performance is of major concern. However, nothing has been offered as a satisfactory solution of various limitations of the present steam traps. These limitations include low thermal efficiency under varying loads and pressures, allowing steam loss during operation, the necessity of maintaining a water seal to avoid continuous discharge of steam, protection from freezing, limited discharge of condensate on a continuous basis, limited air venting capacity, inability to adjust the trap on-stream, limited use with super heated steam, on-stream damage due to water hammer, closure of the trap due to failure, protection from any steam impingement that might damage the equipment, failure to be self-adjusting to various pressure changes of the steam flow, requires an open discharge outlet at the site of use, inconsistent operation particularly upon aging, limited to low pressure operation, design or construction requires continuous steam bleed resulting in substantial waste even with light loads, mechanical parts are subject to sticking, necessity of condensate holdback may cause water logging of the flow system, and limitation to certain inlet pressures. These limitations are not present in all types of steam traps, but each type of steam trap suffers with some of these limitations and even the best choice leaves some disadvantages.

OBJECTS OF INVENTION

None of the prior art devices have provided a solution to the limitations of the steam traps and control valves as outlined above. Accordingly, it is an object of this invention to provide a control valve that operates on the principle of temperature increase of a fluid to control the rate of flow of that fluid.

It is a particular object of this invention to provide a steam trap without a mechanical float or thermo expansion of a bellows to close or open a machined orifice with a tapered plug. Accordingly, it is an object of this invention to provide a steam trap design that is not prone to wear, plugging or substantial maintenance problems relating to internal components of typical steam traps.

It is a further object of this invention to provide a trap that is not affected by or subject to freezing, due to the requirement of a condensate reservoir or the internal design of the device.

It is a particular object of this invention to vent all system air and accumulated water or other condensate as soon as possible. The invented device provides just such performance.

It is an additional object of this invention to provide a cold port opening through the steam trap, but adequate to pass particulates and fluid surges without clogging or restriction of flow, and continued operation.

It is a further object of this invention to provide a trap that is multipurpose in nature, such that it may be used in a wide range of condensate flow, operating pressure, pipe size and system application, and avoid a multitude of trap-size configurations.

It is a further object of this invention that steam traps may be provided that may be adjusted on stream, due to a change in upstream or downstream conditions, including changing its operation from wet to dry or vise versa.

It is a further object of this invention to provide a trap with essentially no mechanical action and in particular with no metal wear parts.

It is a particular object of this invention to provide a steam trap configuration capable of insertion in line and of small compact size by comparison with present steam traps.

It is a particular object of this invention to provide a trap wherein the one size fits essentially all applications and means.

It is an additional object of this invention to provide a steam trap wherein cooler temperatures actually expand the orifice and flow through the trap to provide a quick and complete discharge of condensate liquid, particularly on start up conditions.

It is a further object of this invention to provide essentially instant response to a completed closed position upon direct steam contact with the trap.

It is a particular object of this invention to provide a closure valve that will compensate for erosion of the inside surface of a pinch valve to prevent leakage.

It is an additional object to provide a steam trap that operates over essentially all pressure ranges. It is a particular object of this invention to provide a method of visually observing trap activity from the outside of the trap, through the measure of the trap's own hydraulic pressure level, such that this pressure indication will indicate trap failure of satisfactory performance.

It is an additional object of this invention to provide a trap that if failure occurs, will fail in the open position.

It is an object of this invention to provide a steam trap that will have long performance life and that will be less expensive to install and operate.

And finally, since one of the solutions to a leaking trap of the prior art is to operate at a higher temperature, it is an object of this invention to provide a steam trap that does not leak at lower operating temperatures, thereby conserving heat and power.

SHORT STATEMENT OF THE INVENTION

Accordingly, a control valve with the flow through the valve automatically controlled by the temperature of the flow is provided. The control valve includes a housing with a flow transport path providing for fluid flow through the housing and the internal mechanisms thereof. In that flow transport path, a flexible flow adjustment device is included to alternatively increase or decrease the fluid flow in the path upon interjection of a change of pressure on a surface of the adjustment device. As illustrated below, this flow adjustment device may take the form of a flexible tube, a diaphragm or any number of additional configurations, but it is sufficient that it be responsive to pressure on its surface to close the flow transport path of the fluid. A closed chamber is provided in direct pressure contact with the flow adjustment device, such that changes in pressure inside the closed chamber will impinge upon the surface of the flow adjustment device to increase or decrease the fluid flow. The closed chamber contains a control fluid, preferably a non-compressible fluid, such as a liquid, of a composition capable of essentially immediate expansion upon a temperature increase of the fluid and of essentially immediate shrinkage upon a temperature decrease of the control fluid. A heat conduction device is interposed in heat conduction communication with the fluid flow in the flow path, capable of conveying temperature changes and thus, heat energy from the fluid flow to the control fluid to effect pressure changes within that control fluid and thus, on the flexible flow adjustment device to change the amount of fluid flow in the flow transport path.

In a preferred embodiment of this invention, a pressure regulator device is connected to the closed chamber that is capable of inducing pressure, irrespective of temperature, to the pressure of the control fluid in the closed chamber.

BRIEF DESCRIPTION OF DRAWINGS

FIG. 4 is a cross-section view of the pressure regulator device taken along Lines 4—4 of FIG. 1.

FIG. 5 is a perspective view of a second embodiment of this invention.

FIG. 6 is a cross-section view of this automatic control valve, taken along Lines 6—6 of FIG. 5.

DESCRIPTION OF PREFERRED EMBODIMENTS

Figure 1:
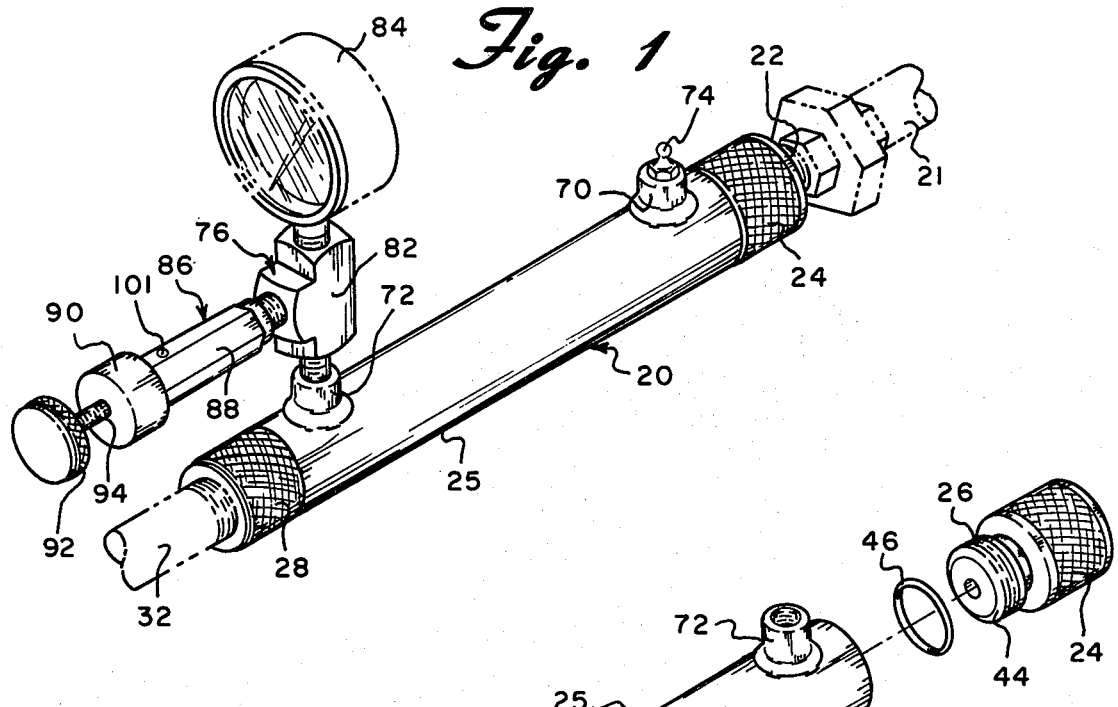
FIG. 1 is a perspective view of the automatic control valve of this invention, shown equipped with a pressure regulator device.
Figure 2:
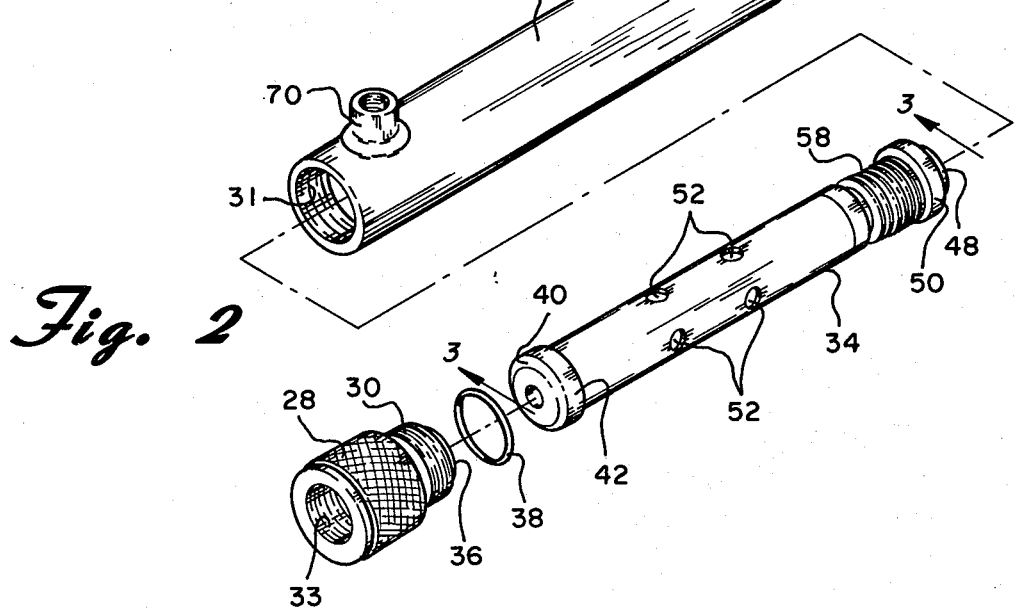
FIG. 2 is an exploded perspective view of the automatic control valve of this invention.
Figure 3:
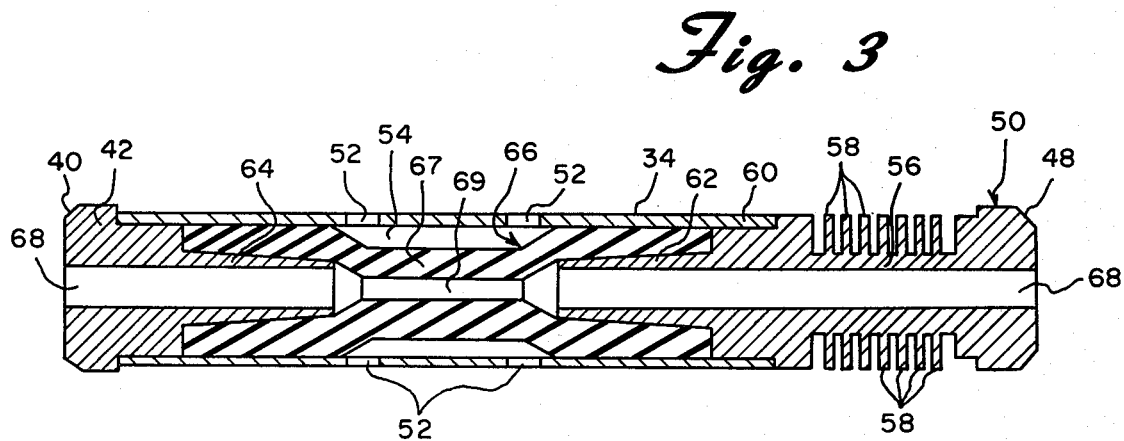
FIG. 3 is a cross-sectional view of a portion of the control valve taken along Lines 3—3 of FIG. 2.

Automatic control valve 20 is pictured in FIG. 1 shown connected to upstream steam line 21 by connecting threaded end 22 into a female thread (not shown) inside front end cap 24. Housing 25 is the main body of control valve 20 and is connected on the flow stream through line 21 by threads 26 on front end cap 24. Rear end cap 28 is connected by threads 30 into housing 25 engaging threads 31. Valve 20 is connected to downstream line 32 and sealed by threads 33 in rear end cap 28. These details are clearly shown in the exploded view of FIG. 2, which shows inner housing 34 as it fits into housing 25 to be held in place at each end by the end caps. Rear end cap 28, when tightened onto threads 31 forces end 36 against "O" sealing ring 38, compressing it against chamferred end 40 of seal plug 42 that is rigidly and sealably attached to inner housing 34. At the upstream end, front end cap 24 is threadably engaged by threads 26 into threads in that end end of housing 25. Chamferred end 44 compresses "O" ring 46 against end 48 of upstream seal plug 50. The outside diameters of the seal plugs 42 and 50 are larger than the outside diameter of inner housing 34, thus forming closed chamber 54 between the outer surface of inner housing 34 and the inside surface of housing 25, as shown in FIG. 3. Actually this closed chamber 54 extends through holes 52 into the interior of housing 34, also as illustrated in the cross-section view of FIG. 3. Seal plug 50 is constructed of a highly heat conductive metal such as copper or brass and has elongated fin conduction section 56 with fins 58 radiating outwardly to provide a high heat conduction communication with the fluid flow along path 68 to chamber 54 and the control fluid inside. Inner housing 34 is constructed of pipe 60 sealed at one end with seal plug 50 and at the other end with seal plug 42, with each plug having tapered extensions 62 and 64 respectively, wedging into opposite ends of neoprene pinch valve 66 and compressing the neoprene ends against the inside surface of pipe 60 to seal the valve in place. Center section 67 of pinch valve 66 is capable of closure upon pressure being applied to the outside surface of center section 67. Housing 25 is equipped with two additional ports, charge port 70 and control port 72, the former being sealed and equipped with ZERT nipple, ball spring closure fitting 74. Pressure regulator device 76 is sealably and threadably engaged into port 72. Pressure gauge 84 is connected to housing 82 to measure the pressure of the control liquid charge and ultimately the pressure in closed chamber 54. Pressure regulator device 86 is constructed of housing 88 threadably sealed to housing 82 with closure cap 90, with hand turn adjusting knob 92 capable of turning threaded rod 94 in cap 90 to adjust the pressure in closed chamber 54. In FIG. 4, a cross-sectional view of pressure regulator device 86 illustrates piston 96 with double ring seals 98, providing air tight seal against inside surface 100 of housing 88 to adjust the pressure through connecting nipple 102 in pressure commuication directly to closed chamber 54. Vent hole 101 in housing 88 is positioned such that when piston 96 is drawn out towards cap 90, the hole is exposed. When control fluid is charged through fitting 74 all gases can be purged out of chamber 54 through hole 101. When chamber 54 is full, piston 96 is screwed back to seal the system and exert pressure on the control fluid in chamber 54.

As illustrated, automatic control valve 20 is an effective steam trap as connected to steam line 21. As hot water condensate flows through steam line 21, it passes through flow path 68 and through closeable path 69 of pinch valve 66 and continuing along flow path 68 out of control valve 20. The control fluid is preferably a liquid that has a high co-efficient of expansion and expands and/or creates pressure when subjected to a temperature increase. It is preferably completely non-compressible, but a small amount of vaporization or a small amount of gas in the system is not an absolutely critical defect. Generally the higher the coefficient of expansion of the control fluid, the smaller the volume size of chamber 54 may be. Automatic control valve 20 provides a continuous flow of condensate and the ability to modulate the flow through the variable orifice design. Old style steam traps provide an essentially on or off mode through a fixed orifice. There is a definite limitation of maximum capacity flow in such a trap, typically about three gallons per minute. That maximum capacity flow is not alterable without changing the trap or the orifice diameter in the trap. However, with control valve 20, it may be adjusted to provide a three gallon per minute flow, but if necessary it can be opened up at start up to provide a flow of ten gallons per minute or even greater. Control valve 20 is easily designed to have a maximum flow essentially equivalent to the highest flow rate of the largest steam traps of any type and size. By use of pressure regulator device 76, flow may be reduced to adjust to particular design configurations of the system. As a result, control valve 20 is basically a universal type steam trap. While the old style steam traps must be specifically chosen for type, size, pressure and capacity needs in the system, control valve 20 in one size may be adjusted on stream to satisfy the performance needs. Further, should an error be made and the flow or other characteristics be greater or less than expected, it is a simple matter to adjust the base control pressure of the control liquid to provide a different flow level to accommodate the calculation error.

The temperature-pressure transfer fluid, generally referred to as "control fluid", located in closed chamber 54 is described as to the physical characteristics required above. Replacing or adjusting this fluid allows changes in the response to various temperature changes. Suitable control fluids are water, alkylene glycols, including ethylene glycol, propylene glycol, diethylene glycol and the like, alcohols including methanol, ethanol, propanol, butanol and the like, and mixtures of the above and with other chemical compounds that exhibit the physical characteristics referred to hereinabove. Other fluids suitable for use in closed chamber 54 include fluorinated and chlorinated hydrocarbons commonly known in the field of FREON compounds, a registered trademark of E. I. DuPont De Nemours & Co. (Inc.). Typically, the FREON compounds have 1 to 3 carbon atoms with halogen substitutions in the range of 2 to 6 atoms. The fluorine substitutions are one or more. Chlorine substitutions are one or more except that it may be zero when there is more than one fluorine substitution. Typical FREON compounds include trichlorofluoromethane (F 11), dichlorodifluoromethane (F 12), chlorotrifluoromethane, chlorodifluoromethane (F 22), trichlorotrifluoroethane (F 113), dichlorotetrafluoroethane (F 114), chloropentafluoroethane, dichlorofluoromethane (F 21), 1-chloro-2,2,2,-trifluoroethane (F 13), 2-chloroheptafluoropropane, dichloromonofluoromethane; 1,2-dichloro-1,1,2trifluorethane, 1,2-dichloro-1,1,2,2,-tetrafluoroethane; methyl fluoride, monochlorofluoromethane, trifluoromethane, 1,1,1,2-tetrafluoroethane, 1,1,1,2,2,-pentafluoropropane, isomers, and the like. Preferred control fluids are alkylene glycol and water mixtures, alcohol and water mixtures, and the less volatile FREON compounds. Particularly preferred is alkylene glycol-water mixtures and most preferred is ethylene glycol-water. An equal weight mix is particularly effective.

Using control valve 20 as a steam trap allows the condensation of the steam without the losses suffered with standard traps which require circulation of a significant amount of steam. It is important to appreciate the ability of this device to adjust almost instantaneously to modest temperature changes. These characteristics may be best described by test runs that have been performed. If control valve 20 has cold water running through it, followed by a surge of steam, it may take as long as thirty seconds to close. However, at operating temperatures wherein the condensate is in the temperature range of 180° to 210° F. followed by a sudden surge of steam at a temperature of 230° to 240° F., control valve 20 is closed essentially immediately with little or no loss of steam. A further test of control valve 20 has illustrated that at 180° the valve is approximately one-quarter closed, at 190° F. about one-half closed, and at 200° F. three-quarters closed. A surge of 50 to 60 psig steam at above 212° essentially immediately slams shut control valve 20. A further experiment utilizes control valve 20 as a steam trap with a 5 to 50 psig control fluid pressure per load. A steam surge adds 50 psig from the steam pressure plus the pressure increase due to expansion of the control fluid. With the control fluid pressure at 0 psig valve 20 tends to act as a hot trap. Thus a preferred range for control fluid pressure is 0 to 50 psig.

A further experiment has been performed to demonstrate the use of the valve in a setup procedure. The temperature-pressure transfer fluid is charged into inlet pipe 74 with hand turn knob 92 screwed outwardly to move piston 96 to provide the maximum open volume in pressure regulator 86 as possible, vent hole 101 open. Control fluid is charged through valve 74 into port 70 to flow into closed chamber 54 until it overflows hole 101. Knob 92 is turned to close hole 101 and to exert pressure on the control fluid in chamber 54 at 25 psig. This pressure may be adjusted to provide a steady stream of condensate. A temperature gauge downstream may be consulted so as to essentially program the temperature of the condensate flow. With a simple adjustment on knob 92, a smooth fixed rate flow based upon the condensate coming to the trap is controlled. A typical temperature of the condensate is 200° F. with essentially no loss of steam despite surges in the system. However, should it be desired to have steam reach downstream, valve 20 may be easily adjusted to a hot trap. With old devices, it was necessary to choose between a hot or cold trap upon installation. The fixed design and characteristics of these traps did not allow an on-stream change. A cold trap holds condensate in the system, while a hot trap holds no condensate and continuously leaks steam, as in a typical standard impulse trap. Many prior traps spurt steam on a sporadic basis with the attendant losses in performance and energy. A common problem is when condensate is collected in a quantity larger than the design allows, causing the condensate to back up into the operating system; the situation is generally described as "choking the system." The only solution to this problem in the prior art was to go to a larger trap. If such a situation arises using valve 20, all that is necessary is to reduce the pressure in the control fluid by unscrewing knob 92. The condensate flow capacity of control valve 20 is for all practical purposes unlimited. Another example of the utility of the valve 20 is demonstrated by a test on a paper roll where a steady high temperature is critical. The temperature in the roll may be controlled manually by adjusting the pressure of the temperature-pressure control fluid when valve 20 is placed on the steam line, giving absolute control of the liquid temperature flow. Using valve 20 the expansion capability of the temperature-pressure transfer fluid is a fixed reading on pressure gauge 84 for a particular temperature flow. A test run demonstrates at a 200° F. flow temperature a satisfactory flow passes with the hydraulic pressure on the control fluid at 30 psig. If the temperature of the flow increases to 205° F., the pressure of the control fluid is automatically increased to 40 psig and the valve closes. Valve 20 will remain closed until the flow again reaches the temperature of 200° F. An additional use of valve 20 is as a safety valve under conditions where a steady state flow of liquid through the valve is needed until a predetermined temperature is reached. For example, domestic hot water systems in a hospital are required to be a maximum of 120° F. in showers. Valve 20 can easily be adjusted to stop the flow of hot water if the flow exceeds 120° F., requiring maintenance upstream in the hot water system.

As will be apparent in the operation of valve 20, in addition to any temperature changes being effective to transfer pressure increases to the temperature-pressure control fluid, any pressure changes in the flow is also transferred immediately to the closed hydraulic system. Therefore, any change in pressure in the closed chamber due to temperature changes is above the ever adjusting base pressure of the flow. For example, if 25 psig steam is passing through valve 20 in a "hot" configuration followed by a surge of lower pressure steam, pinch valve 66 is partially closed immediately due to the lower pressure in the flow stream, followed by essentially immediate further restriction due to the lower temperature of the flow reducing the pressure in the closed system. Thus, the variable flow according to the temperature is always above a base pressure. As a result of the pressure gauge as being part of the device, trap activity can be observed directly. Failure in the trap is observed directly rather than some downstream aberration.

In the start-up condition, knob 92 may be adjusted to provide 3 to 5 psig at room temperature. Under these conditions, any pressure up to about 10 psig provides for essentially dumping conditions wherein pinch valve 66 is nearly wide open. Under working conditions, pressure will vary in the range of 30 to 40 psig such that it is completely closed at the high end of that range and is significantly opened to provide sufficient condensate flow at the lower end of the range. No strainer is required with valve 20 inasmuch as clogging is not a significant problem. A further test to illustrate compensation for erosion and foreign matter includes scarring the inside surface of path 69 of pinch valve 66 and inserting a BB slot in path 69 before closure with steam. The pressure compensation system allows no leaks.

Another embodiment of the invention is illustrated in FIG. 5 and in more details of cross-sectional view of FIG. 6. In this embodiment control valve 104 takes on the outside shape of a flanged pipe joint and takes up little additional line space along flow path 106. Entrance pipe 108 and exit pipe 110 are each internally threaded to be connected on stream with little difficulty. Control valve 104 is basically constructed in two halves, including upper housing 112 and lower housing 114 bolted together with bolts 116, utilizing appropriate sealant and gaskets throughout to prevent leakage (not shown for clarification purposes). Upper housing 112 is equipped with charge valve port 118 and control port 120 is connected to pressure regulator device 76 which serves the same function as with valve 20. Threads 122 in entrance pipe 108 provide interconnection with the pipe providing fluid flow along path 106 which enters the internal portion of control valve 104 through cylindrical port 124 into inverted dish shaped chamber 126, from which there are four fluid passageways 128 which carry the fluid flow along flow path 106. As pictured in FIG. 6, only two of the four passage ways are illustrated in a schematic fashion for clarification purposes in that each of the four passageways 128 extend at 90° angles from the center of chamber 125, passing first horizontally through housing 112, turning vertically downwardly through a hole in heat conduction plate 130, continuing downwardly through a hole in flat elastic membrane 132, constructed of a sheet of three-sixteenth inch neoprene rubber, into lower housing 114, turning horizontally in the body of housing 114 and emptying into exit housing 134 shaped in the form of a concave dish with circular exit port 136 in the center. To reduce wear (although not shown) the corner of the start of port 136 is chamferred. In this embodiment it is important that the horizontal passageway 128 open on the inclined side of exit chamber 134 at openings 138. Heat conduction plate 130 is constructed of a highly heat conductive metal, such as copper or brass and has on surface 140 heat conduction assisting fins (not shown for clarification) such that when the fluid flow through passageway 106 inpinges on surface 140 there will be a high rate of heat conduction through wall 142 into closed chamber 144, which serves the same general purpose as closed chamber 54 in valve 20. Chamber 144 is equipped with pressure connective passageways 146 to charge valve port 118, that passageway first extending through the body of heat conduction plate 13 and then into upper housing 112 and opening into charge valve port 118. Closed chamber 144 is also equipped with passageway 148 which provides pressure communication first through heat conductor plate 130 and then through upper housing 112 opening to control port 120. The concave dish shape of cavity 134 may be modified to a shallow trough shape with the sides generally in the shape of cylinders and the ends essentially vertical. A rectangular diaphragm to replace diaphragm 132 is pressed into the trough by increased pressure to close apertures along the curved sides of the trough shape.

Operation of control valve 104 is similar in principle to that of valve 20 such that fluid such as a mixture of steam and water condensate passing along flow path 106 enters chamber 126 through port 124 and impinges directly on surface 140 of heat conduction plate 130, such that any temperature differential between the fluid in flow path 106 is directly transmitted to the temperature-pressure control fluid in chamber 144. If the temperature differential is nil, there will be no expansion or contraction of the temperature-pressure transfer fluid and membrane 132 will not move unless there is a pressure change in the flow. Although membrane 132 is shown in a fully horizontal position, in actual practice, some pressure will be created on the fluid in chamber 144, forcing membrane 132 downwardly toward openings 138 in the direction to partially close or completely close passageways 128 at openings 138. If the fluid flow along path 106 is relatively cool as anticipated by the pressure regulation of the temperature-pressure control fluid in chamber 144 through a pressure regulator device 76, membrane 132 will only have partially closed openings 138 allowing liquid to pass out of exit port 136. When the condensate of the fluid flow along path 106 changes to steam or partially to steam, the elevated temperature of the fluid flow striking surface 140 will effect an expansion of the temperature-pressure control fluid in chamber 144, forcing membrane 132 downwardly into the concave cavity of chamber 134 and essentially closing openings 138 and terminating all flow. In this fashion, control valve 144 is utilized as a steam trap. Its control to completely cease the flow of any steam until condensate recollects again or providing a slight passage of steam may be easily adjusted through passageways 145 by pressure adjustment through charge port 118, utilizing pressure regulator 76. Downstream temperature readings provide a clear indication of the flow characteristics along flow path 106 and whether any steam is passing through the control valve.

The material of the flow adjustment device, such as for the flexible tube or diaphragm, is not particularly critical except that it retain the necessary closure and opening capabilities through a range of temperatures and provide a long life upon steady exposure to fluids at elevated temperatures. While NEOPRENE and butyl rubbers are satisfactory, the higher temperature elastomers are preferred, even up to the silicon rubbers offering the highest operating temperatures. HYPALON, VITON-B, and NORDELL elastomers are particularly effective. Elastomeric compositions are preferred for construction of the flow adjustment device.

While I have described my invention in connection with specific embodiments, it is to be clearly understood that this description is made only by way of example and not of limitation to the scope of my invention as set forth in the following claims.

I claim:

1. A control valve with flow automatically controlled by the temperature flow, comprising:
   (a) a housing, (b) an essentially unobstructed flow transport path for fluid flow through the housing, (c) a flow adjustment means comprising a flexible tube surrounding the flow transport path to alternatively decrease the fluid flow in the path upon an increase of pressure on a surface of the flow adjustment means or increase the fluid flow in the path upon a decrease of pressure on a surface of the adjustment means, (d) a closed chamber in direct pressure communication with the surface of the flow adjustment means, and in direct pressure communication with the flow transport path, (e) a control fluid essentially filling the chamber having a high coefficient of thermal expansion and essentially resisting any compression due to increased pressure exerted externally, and (f) a heat conduction means in the flow path to convey heat mainly to and from the flow and the control fluid.

2. The valve of claim 1 wherein (a) the closed chamber is in flow communication to an entrance port with a closure valve, (b) a pressure gauge is in pressure communication with the chamber to read the pressure of the control fluid, and (c) a pressure regulator means is in pressure communication with the closed chamber, capable of inducing and controlling the pressure of the control fluid in the closed chamber.

3. The valve of claim 1 wherein the flow adjustment means comprises a tube capable of closure upon the placement of pressure on the outside surface of the tube.

4. The valve of claim 1 wherein the flow adjustment means comprises a flexible silicone rubber tube.

5. The valve of claim 1 wherein the flow adjustment means comprises a flexible, reinforced rubber tube.

6. The valve of claim 1 wherein the closed chamber comprises a flexible wall of the flow path.

7. The valve of claim 1 wherein the closed chamber comprises a cylindrical chamber surrounding a flexible tube.

8. The valve of claim 7 wherein the cylindrical chamber comprises a highly heat conductive wall separating the chamber from the flow path.

9. The valve of claim 1 wherein the control fluid is a non-compressible fluid.

10. The valve of claim 1 wherein the control fluid is chosen from one or a mixture of a group of compounds consisting of alkylene glycol of two to six carbon atoms, water, alkanols having one to four carbon atoms and fluorinated and chlorinated hydrocarbons having one to three carbon atoms with halogen substitution in the range of two to six atoms.

11. The valve of claim 1 wherein the control fluid is a mixture of akylene glycol of two to six carbon atoms and water.

12. The valve of claim 1 wherein the control fluid is a mixture of ethylene glycol and water.

13. The valve of claim 1 wherein the control fluid is an equal weight mixture of ethylene glycol and water.

14. The valve of claim 1 wherein the heat conduction means is a highly conductive metal member, having one surface exposed to the control fluid and the opposing surface exposed to the flow.

15. The valve of claim 14 wherein the member has heat conduction fins on at least one side of the member.

16. The valve of claim 1 wherein the heat conduction means is a tubular metal member with the flow inside the tube and the control fluid in heat conduction contact on the outside of the member.

17. The valve of claim 1 wherein the closed chamber has an inlet port in flow communication to storage of the control fluid.

18. The valve of claim 2 wherein the pressure regulator means comprises a housing and a vent hole in the housing to allow venting of gases and overflow upon filling the closed chamber.

19. The valve of claim 1 wherein an expansion limiting means is located in the chamber to limit the distance the flow adjustment means may move upon pressure in the flow path.

20. The valve of claim 1 wherein a pressure regulator means is in pressure communication with the closed chamber, capable of inducing and controlling the pressure of the control fluid in the closed chamber.

21. The valve of claim 1 wherein the flow adjustment means comprises an elastomeric, flexible wall of the flow path.

22. A control valve with flow automatically controlled by the temperature flow, comprising:

(a) a housing, (b) a flow transport path for fluid flow through the housing, (c) a flexible flow adjustment means comprising a flexible tube surrounding the flow transport path to alternatively increase or decrease the fluid flow in the path upon a corresponding decrease or increase of pressure on a surface of the adjustment means, (d) a closed chamber in direct pressure communication with the surface of the flow adjustment means, and in direct pressure communication with the flow transport path, (e) an essentially non-compressible heat-pressure transfer control fluid means, essentially filling the chamber, of a composition capable of essentially immediate expansion upon temperature increase of the fluid means, and shrinkage upon temperature decrease of the fluid means, and (f) a heat conduction means in the flow path to convey heat mainly to and from the fluid flow and the transfer means.

23. A control valve with flow automatically controlled by the temperature of the flow, comprising:

(a) a tubular housing, (b) a transport path for fluid flow essentially down the center of the tubular housing, (c) an elastic tubular member as part of the transport path, (d) an inner rigid tubular member inside the housing, around the tubular member, (e) a closed chamber in direct pressure communication with the outside surface of the elastic tubular member, (f) an essentially noncompressible temperature-pressure transfer control fluid essentially filling the closed chamber, having the composition with the physical characteristics to provide essentially immediate expansion upon temperature increase and essentially immediate shrinkage upon temperature decrease, the capacity to transmit the expansion and shrinkage pressure essentially directly to the outside surface of the elastic tubular member, and (g) a heat conduction section of the transport path in direct heat communication between the fluid flow of the transport path and the temperature-pressure transfer control fluid.

24. The valve of claim 23 wherein a pressure regulator means is in pressure communication with the closed chamber, capable of changing and controlling the pressure of the control fluid in the closed chamber.

25. A control valve with flow automatically controlled by the temperature flow, comprising:
(a) a housing,
(b) a flexible tube having an essentially unobstructed flow transport path for fluid flow through the housing,
(c) a closed chamber in direct pressure and temperature communication with the outer surface of the flexible tube,
(d) a control fluid essentially filling the chamber having a high coefficient of thermal expansion and essentially resisting any compression due to increased pressure exerted externally, and
(e) a heat conduction means in the flow path to convey heat mainly to and from the flow and the control fluid.

26. A control valve with flow automatically controlled by the temperature flow, comprising:
(a) a housing,
(b) a flow transport path for fluid flow through the housing,
(c) a flow adjustment means in the flow transport path to alternatively decrease the fluid flow in the path upon an increase of pressure on a surface of the flow adjustment means or increase the fluid flow in the path upon a decrease of pressure on a surface of the adjustment means,
(d) a closed chamber in direct pressure communication with the surface of the flow adjustment means, and in direct pressure communication with the flow transport path, the closed chamber comprising a cylindrical chamber surrounding a flexible tube with a highly heat conductive wall separating the chamber from the flow path,
(e) a control fluid essentially filling the chamber having a high coefficient of thermal expansion and essentially resisting any compression due to increased pressure exerted externally, and
(f) a heat conduction means in the flow path to convey heat mainly to and from the flow and the control fluid.

27. A control valve with flow automatically controlled by the temperature flow, comprising:
(a) a housing,
(b) a flow transport path for fluid flow through the housing,
(c) a flow adjustment means in the flow transport path to alternatively decrease the fluid flow in the path upon an increase of pressure on a surface of the flow adjustment means or increase the fluid flow in the path upon a decrease of pressure on a surface of the adjustment means,
(d) a closed chamber in direct pressure communication with the surface of the flow adjustment means, and in direct pressure communication with the flow transport path,
(e) a control fluid essentially filling the chamber having a high coefficient of thermal expansion and essentially resisting any compression due to increased pressure exerted externally, and
(f) a heat conduction means in the flow path to convey heat to and from the flow and the control fluid comprising a tubular member with the control fluid in direct heat conduction contact on the outside of the member.

* * * * *